United States Patent [19]

Bowen

[11] 4,361,134
[45] Nov. 30, 1982

[54] SOLAR ENERGY COLLECTOR ASSEMBLY AND SUB-ASSEMBLIES THEREOF

[75] Inventor: John C. Bowen, Huntingdon Valley, Pa.

[73] Assignee: Ametek, Inc., New York, N.Y.

[21] Appl. No.: 94,648

[22] Filed: Nov. 15, 1979

Related U.S. Application Data

[62] Division of Ser. No. 935,406, Aug. 21, 1978, Pat. No. 4,201,190.

[51] Int. Cl.³ .................................................. F24J 3/02
[52] U.S. Cl. ..................................... 126/417; 126/450
[58] Field of Search ................. 126/450, 417, 443, 444

[56] References Cited

U.S. PATENT DOCUMENTS 3,980,071  9/1976  Barber .................................. 126/450
4,119,083 10/1978  Heyen .................................. 126/450
4,120,287 10/1978  Marles et al. ........................ 126/450
4,136,669  1/1979  Lane .................................... 126/450
4,159,017  6/1979  Novi .................................... 126/450

Primary Examiner—Daniel J. O'Connor
Attorney, Agent, or Firm—Ratner & Prestia

[57] ABSTRACT

Solar energy collector assembly including a solar energy collector in an enclosed space housing with bottom closure member secured by a snap-fit spring channel and low thermal conductivity mating projection therefor, a collector member securing means comprising a plurality of stiff low thermal conductivity wire retainers and top cover securing and sealing means comprising a seal and clamp engaging the top cover just inward of its periphery, to prevent intrusion of condensate in the enclosed space of the housing.

11 Claims, 19 Drawing Figures

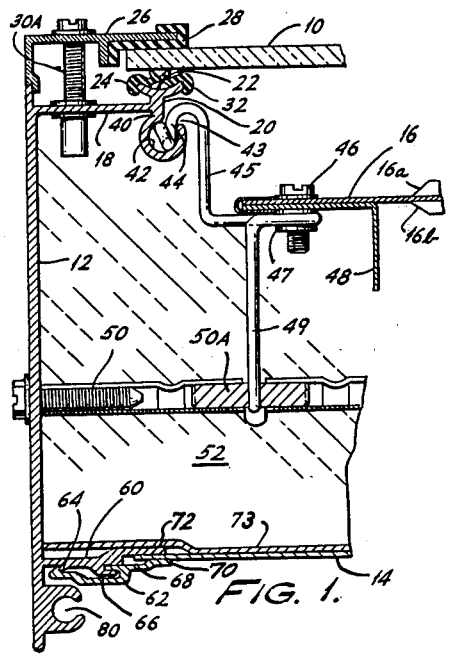
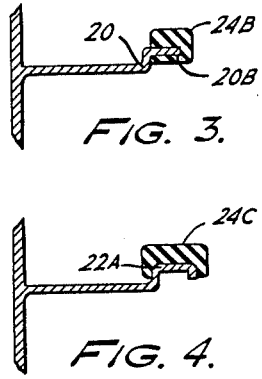
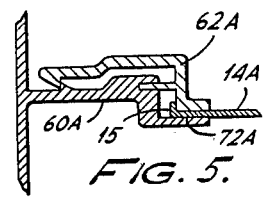
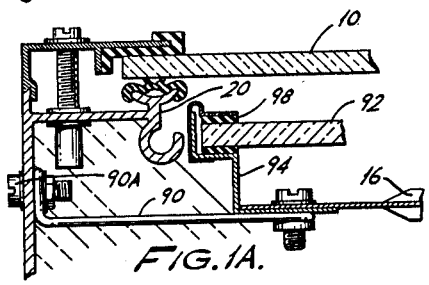
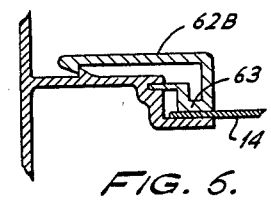
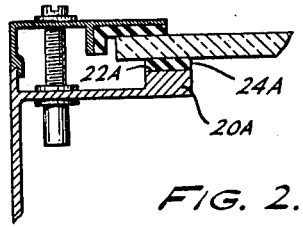
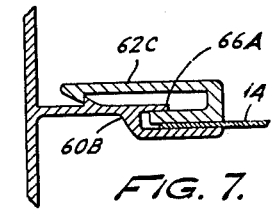

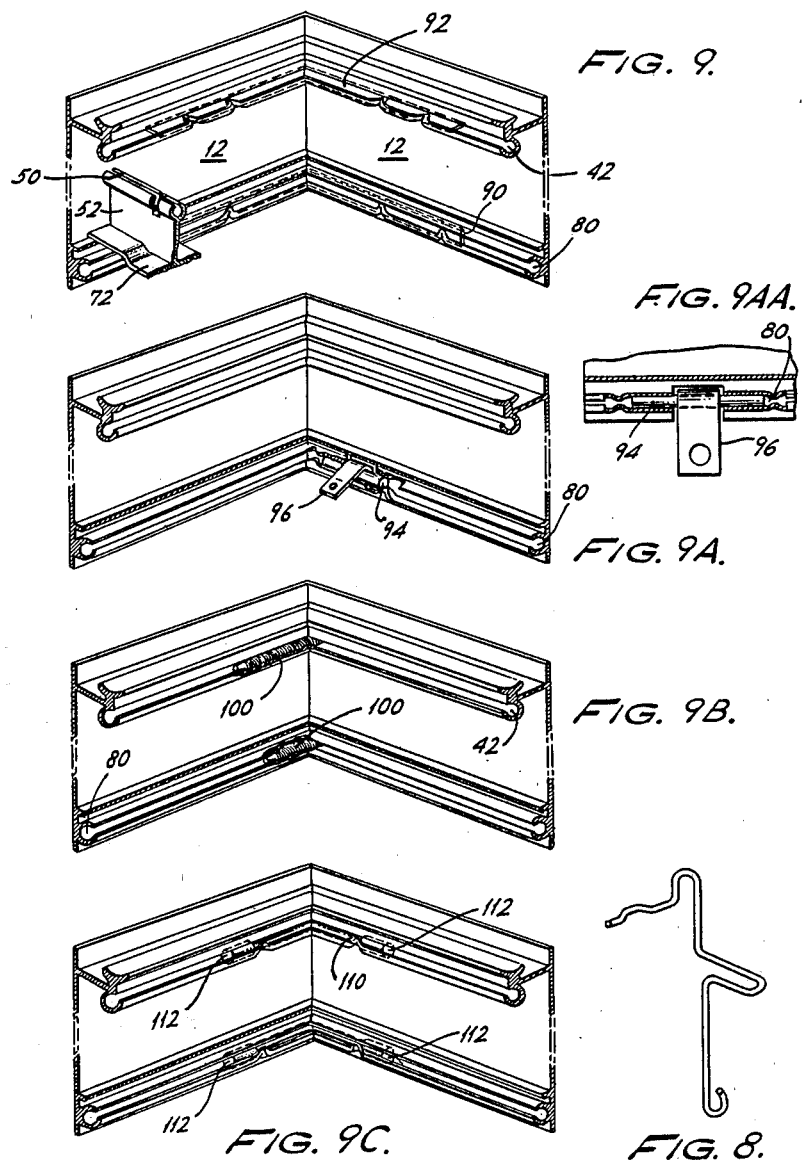

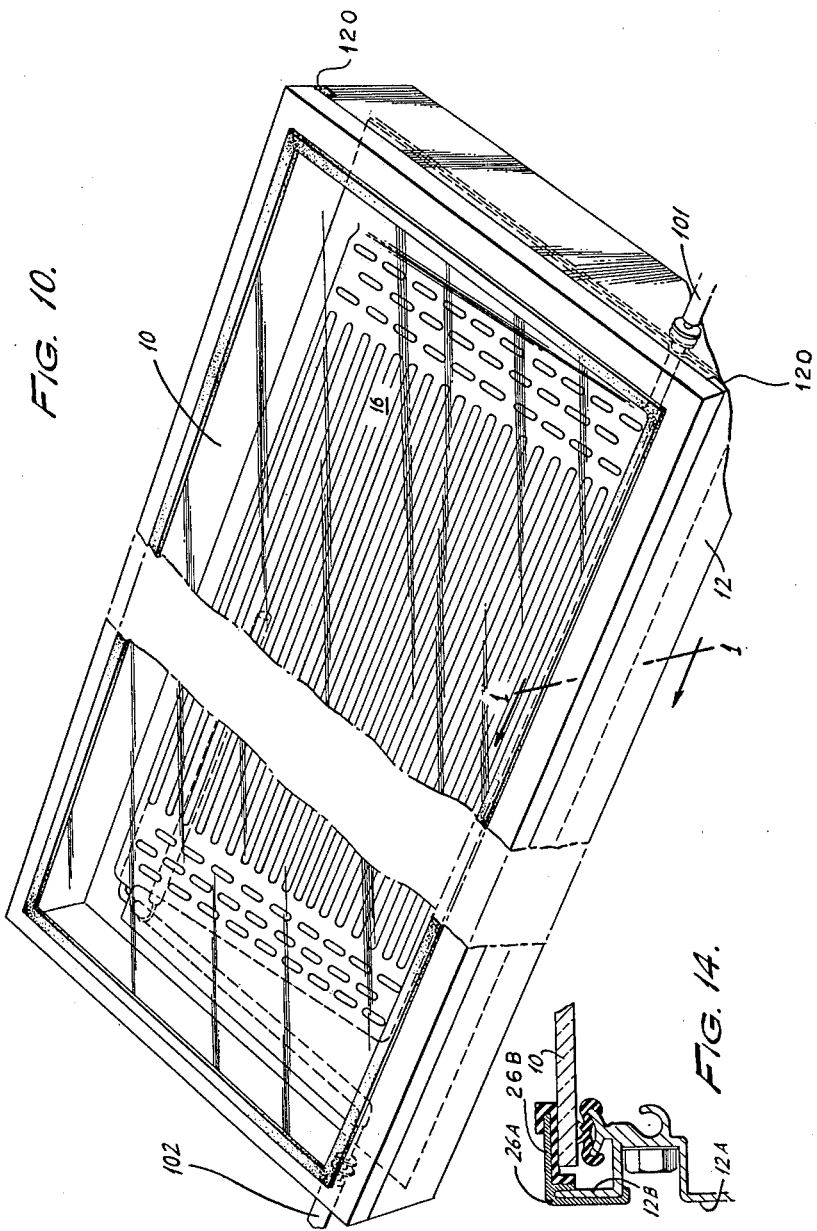

SOLAR ENERGY COLLECTOR ASSEMBLY AND SUB-ASSEMBLIES THEREOF

This is a division, of application Ser. No. 935,406, filed 8-21-78, now U.S. Pat. No. 4,201,190.

This invention pertains to an improved solar energy collector assembly and sub-assemblies thereof, and particularly to such an assembly wherein massive thermal loss conductivity paths and condensation within the assembly are minimized.

With the increasing interest in solar energy utilization, there has evolved a wide variety of solar energy collector assemblies. In each case, a solar energy collector is included. This may comprise, for example, a flat surface with conduits for heat exchange fluid and means for passing the fluid to and receiving fluid from the conduits so as to transfer absorbed energy to the heat exchange fluid and thence to some remote utilization point. However, thermoelectric devices, wherein solar energy is converted directly into electrical energy may also be utilized as the solar energy collector, even though such devices are not commonly considered to be "collectors" as such.

In any event, the efficiency of such assemblies depends in large part on the assembly design and in particular on the avoidance of heat losses and the attendant dissipation of incoming solar energy to the surrounding environment rather than to the collector.

While the need to improve such assembly designs has been recognized and to some extent dealt with by a number of developments directed to minimizing heat loss and maximizing solar energy collection, there remains the need for still further improved and more efficient solar collector assemblies and more particularly to such assemblies which are readily and inexpensively manufacturable.

With this as background, it is the general object of the present invention to provide a solar collector assembly design, and particularly a combination of sub-assemblies thereof, which provide a solar collector assembly that is lightweight, readily manufactured and assembled, and in which mass is reduced and heat loss paths are minimized so as to improve the efficiency of solar energy collection within the assembly.

A more specific object of this invention is to provide a solar energy collector assembly with improved top cover and bottom cover securing means and collector securing means, in all of which heat loss flow paths are minimized.

These objects and others which will become apparent during the course of the subsequent description of this invention, are met, briefly, by a solar energy collector assembly including elongated side members combined with a transparent sheet top cover and a bottom closure member to provide an enclosed space housing within which a solar energy collector means is located. In such an assembly, this invention includes specifically a bottom closure member securing means comprising a thin projection near the bottom of the side members extending along the length thereof, which projection includes an inner edge extending over the outer periphery of the bottom closure member. The inward projection also includes mating tips for a spring channel which engages the projection and abuts the closure member, urging it against the inner ege of the inwardly extending projection.

The solar energy collector assembly of this invention, in its preferred embodiment, also includes collector member securing means comprising a plurality of stiff low thermal conductivity wire retainers disposed at spaced intervals about the periphery of the collector, these retainers being attached to the collector and to the side members of the assembly.

Finally, this assembly includes a top cover or transparent sheet securing and sealing means comprising a seal engaging the bottom surface of the top cover along and inward of the periphery thereof with a clamping means associated with the side members to press the top cover downwardly into engagement with the seal. The free outer edge of the seal and top cover permit condensate to escape outwardly from the seal area rather than remaining in contact with the seal and possibly inwardly to the interior of the collector housing.

Numerous alternatives and additional features, described below, are also within the scope of the present invention.

For a better understanding of this invention, reference may be made to the detailed description thereof which follows taken in conjunction with the appended claims and the accompanying drawings, in which:

FIG. 1 is a partial side sectional view of the preferred embodiment of the solar collector assembly of the present invention;

FIG. 1A is a modified form of the invention shown in FIG. 1;

FIG. 2 is an expanded sectional view of an alternative front cover clamping means;

FIGS. 3 and 4 are expanded sectional view of alternative front or top cover seals or gaskets;

FIGS. 5-7 are sectional expanded views of alternative forms of bottom closure securing means;

FIG. 8 is a detailed view in perspective, of a collector retainer clip, of the type used in the assembly shown in FIG. 1;

FIG. 9 is a perspective view of the mating sidewalls of a solar collector assembly as shown in FIG. 1, in which is shown specifically one means for securing the sidewalls at their mating corners;

FIG. 9A is a view similar to that of FIG. 9, in which is shown a means for hingedly mounting the solar collector assembly of this invention;

Figure 11:
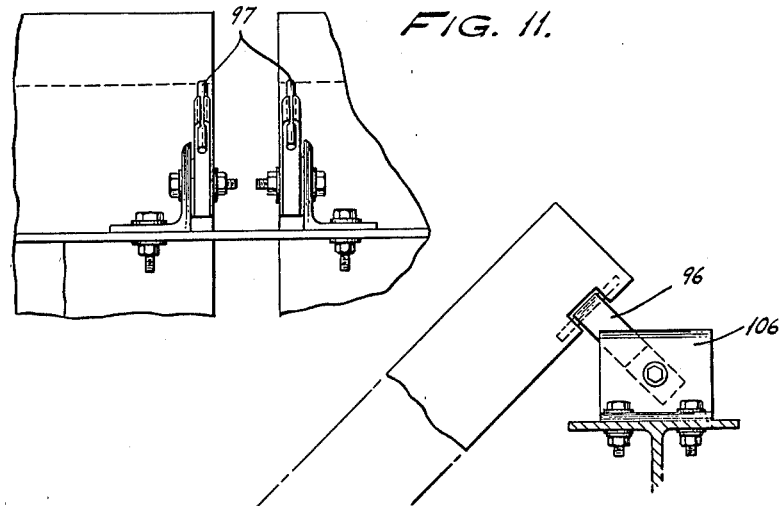
Figure 12:
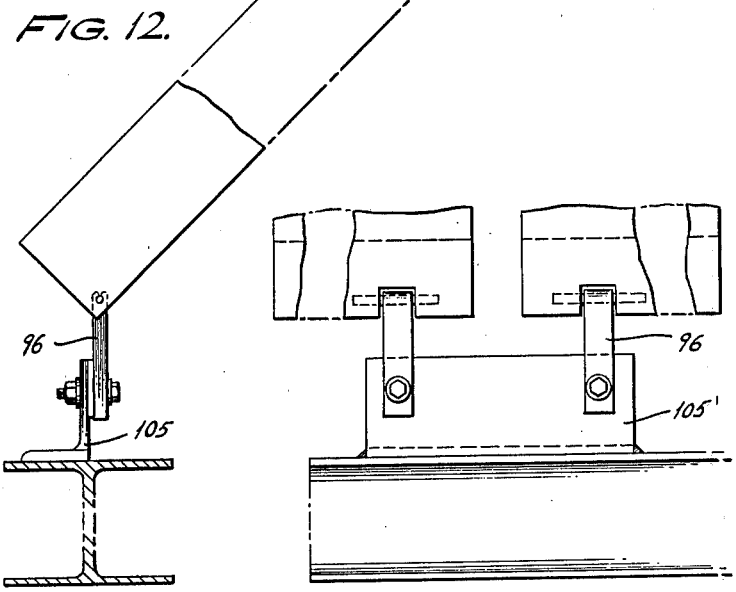
Figure 13:
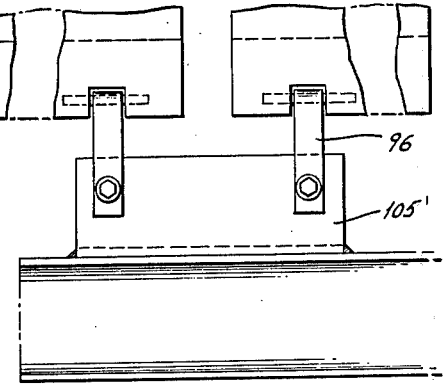

FIG. 9AA is a side view of the hinged mounting otherwise shown in FIG. 9A;

FIG. 9B is still another perspective view similar to FIG. 9A in which alternative means are provided for securing the mating sidewalls at their mitered corner;

FIG. 9C shows still another alternative means for securing the sidewalls of the assembly at their mitered corner;

FIG. 10 is a perspective view, showing the assembled solar collector assembly of this invention as it would be mounted for use;

FIG. 11 is a detailed view showing one means of mounting the solar collector assembly of the present invention;

FIG. 12 is a side view showing both top and bottom mountings for a solar collector assembly of the present invention;

FIG. 13 is a detailed front view of the bottom mounting means otherwise shown in FIG. 12; and FIG. 14 is a detailed sectional view of a modified top cover clamping means.

Turning more specifically to FIG. 1, there is shown a side section, along an upside down "T"-shaped cross rib, of a solar collector assembly including a transparent sheet top or front cover member 10, typically composed of glass or clear plastic, elongated side member 12 (this sectional view cutting through the length dimension thereof which is perpendicular to the plane of the drawing), typically composed of extruded aluminum, and bottom closure member 14, typically composed of sheet metal or plastic. Top cover member 10 and bottom closure member 14, together with elongated side member 12 and other like side members disposed about the periphery of top cover member 10 and bottom closure member 14, form an enclosed space housing within which is disposed a solar energy collector 16, typically comprising an absorptive top surface 16a and heat exchange fluid conduits 16b, through which pass the heat exchange fluid (not illustrated) for absorption of solar energy and transmission of same to a remote energy transfer or consumption point outside of the enclosure.

Along the top edge of elongated side member 12, it includes inwardly turned flange 18 with an upwardly turned lip 20 and an upwardly facing top surface 22, on which is retained a seal gasket 24. Seal gasket 24 is clamped into sealing engagement with top cover member 10 just inwardly of the outer periphery thereof, in order to permit condensate at the edge thereof to drain away from the seal without seeping into the interior of the enclosed space housing of the solar collector assembly.

Top cover member 10 is held in sealing engagement with seal gasket 24 by a top clamping member 26 which extends up and over top cover member 10, with a non-metallic thermal barrier member 28 interposed therebetween, and is retained thereon by bolt 30A. To prevent inward movement of member 26, the mating upper edge of side member 12 and lower edge of top clamping member 26 are inclined upwardly toward their inner facing sides. Drain holes 120 (in FIG. 10) are provided on the bottom side of the assembly near the top edge of the side member 12 above member 18 to permit escape of condensate forming at the edge of top cover member 10 around the periphery thereof.

In this the preferred form of the present invention, upwardly facing surface 22 of lip 20 includes a slight downward concavity which is opposite an upward concavity in the bottom of seal gasket 24, forming between them a space 32 which enables gasket 24 to remain resilient even when pressed flat on its top side while providing high local unit stress on the gasket to assure effective sealing with top cover member 10 and lip 20. Seal gasket 24 further includes a bead, or actually a pair of beads in this embodiment, running along the top center line thereof, such that upon the clamping of top cover member 10 downwardly therewith, the upward concavity of seal gasket 24 is pressed downward so as to effect a seal along the bottom side of top cover member 10 near the edge thereof; and this seal is formed regardless of waviness or irregularities therein, the beads of seal gasket 24 being pressed downwardly in conformation to the bottom surface of top cover member 10. For more convenient assembly and secure positioning, seal gasket 24 also includes side beads 32 along the length thereof which snap fit over the edges of lip 20 to be retained thereon.

Inwardly turned upper flange 18 of elongated side member 12 also includes a downwardly turned lip 40 with a channel 42 having an upwardly facing opening 43 adapted to receive and engage, by point or line contact (for minimization of thermal losses), one leg 44 of an inverted "U" of a plurality of collector supporting clips 45, which clips are typically composed of a low thermal conductivity (e.g. stainless steel) stiff wire bent into a shape better seen in FIG. 8. Wire clips 45 are disposed at spaced intervals about the periphery of collector 16 for the support thereof and for that purpose are secured thereto by securing means, such as bolt 46 and nut 47, together with a collector edge supporter-stiffener 48 disposed about the periphery of collector 16. A downward extension 49 of wire clip 45 is supported also by an insert 50A in one of several cross projecting ribs 52 extending from elongated side member 12. Each cross rib 52 comprises essentially an upside down "T" beam with a "T" cross arm 73 at the bottom thereof and a bolt channel 50 at the top thereof (all of which may be better seen in FIG. 9).

Near the bottom edge of elongated side member 12 an inwardly extending projection 60 runs along the length of elongated side member 12 and acts in conjunction with spring channel 62 as a bottom closure member securing means, spring channel 62 being retained between spring channel retaining tips 64 and 66. Tip 64 is adapted to prevent inward movement at the outer end of spring channel 62 while tip 66 forms a groove to receive an outwardly projecting lip 68, spring channel 62, being slightly groove to receive an outwardly projecting lip 68, spring channel 62, being slightly distended thereby, such that the inward portion 70 thereof is slightly distended and urged into engagement with the outer peripheral edge of bottom closure member 14, which also abuts, on its opposite face inner edge 72 of inwardly extending projection 60. The bottom closure member 14 may also be adhesively secured to the flat bottom surface of "T" rib cross arms 73 for support and rigidification of closure member 14.

At the bottom edge of elongated side member 12 is disposed a mating side member attachment means comprising, in this embodiment of the invention, a channel 80 running along the length of elongated side member 12.

As shown in FIG. 9, channel 80 may be miter cut at the mating corners of adjoining elongated side members 12 with a slip fit and crimped angle bar 90 retained therein and extending over the miter cut at the corner, thereby to secure to one another the adjoining elongated side members 12. Also as shown in FIG. 9, a similar bar 92 slip fit and crimped in channel 42 may be used to secure adjoining side members 12 near the tops thereof.

As shown in FIG. 9A, channel 80 may also receive a hinge pin 94, crimped to prevent axial movement, as shown in FIG. 9AA, pin 94 in turn receiving a mounting bracket 96. Bracket 96 is free to pivot about pin 94 and thereby provide a hinged mounting means for the solar collector assembly.

Alternatively, as shown in FIG. 9B, channels 80 and 42 are also adapted to receive retainer bolts 100 projecting through the adjoining side members and into channels 80 and 42, thereby to secure the adjoining side members to one another.

Still another means for securing adjoiing side members to one another in an assembly of the type disclosed herein is shown in FIG. 9C. More specifically, corner spring rod members 110 may be adapted to be retained in channels 42 and 80, thereby to secure the side members to one another. Enlarged diameter terminal segments 112 may be provided on rod members 110 to facilitate insertion and secure placement of rods 110.

FIG. 1A shows an alternative embodiment of the invention in which solar collector 16 is supported on a plurality of inwardly extending mounting means 90, such as stainless steel wire brackets secured to side member 12 by bolts 90A. For still better thermal isolation of collector 16 in this embodiment of the invention, a second transparent cover 92 is interposed between collector 16 and top cover 10. The inner transparent cover 92 may be mounted, for example, by a peripheral channel support 94, separated by gasket 98 in turn bolted along with solar collector 16 to inwardly projecting mounting means 90.

Various other alternative design features may be incorporated in an overall assembly of the type shown in FIG. 1, as better illustrated in FIGS. 2-7. Turning more specifically to FIG. 2, there is shown a seal gasket 24A with a simple rectangular cross section and mating upper surface 22A of upwardly turned lip 20A.

In FIG. 3, there is shown still another form of seal gasket 24B, adapted to fit onto an inner flange 20B at the top of upwardly turned lip 20B. Similarly, in FIG. 4 there is shown still another form of seal gasket 24C which fits over an inverted U upper segment 22A of upwardly turned lip 20C.

Alternative bottom closure member securing means are shown in FIGS. 5-7. In particular, in FIG. 5, it will be noted that the outer peripheral edge 15 of bottom closure member 14A is turned upwardly so as better to be retained by spring channel 62A which, in this embodiment, presses downwardly against the outer peripheral portion of bottom closure 14A and against the oppositely abutting inner edge 72A of inwardly extending projection 60A.

Still other embodiments are shown in FIGS. 6 and 7, wherein a U-shaped pressing portion 63 of spring channel 62B is adapted to engage the outer peripheral portion of bottom closure member 14 upon engagement of spring channel 62B, and the slight distention thereof upon such engagement.

In FIG. 7, an embodiment of the bottom closure securing means is shown wherein bottom closure member 14 extends into and is retained in the groove formed by retaining tip 66A of inwardly extending projection 60B, in combination with still another form of spring channel 62C.

In FIG. 10, there is shown in perspective view a partially cut away assembled unit based on the design otherwise shown in FIG. 1, wherein there is shown as additional elements inlet conduit 101 and outlet conduit 102.

Mounting of a solar collector assembly of the kind disclosed and claimed herein may be accomplished in numerous ways; however, some provision is preferably incorporated in said mounting means as to permit thermal expansion and contraction of the unit. Thus, in FIG. 12, there is shown schematically such mounting means including a hingedly attached mounting member 96 of the type otherwise seen in FIGS. 9A and 9AA, which is in turn fixedly secured to a static mount 105, as shown for adjacent assemblies in FIG. 13. Such hinged mounting means permits the assembly to be secured at different mounting angles depending on the position of the assembly within an array, or the incident angle desired at a given location for a given time.

The upper end of the solar assembly shown in FIG. 12 is also secured along the sides thereof, by a mounting bracket 96, in turn secured to a static mount 106. In the case of the upper mounting, mounting bracket 96 is free to slide slightly along the length of pivot pins 97 as also seen in FIG. 11. Similarly, mounting brackets 96 at the lower end of the solar collector assemblies are also free to slide along the axis of their corresponding mounting pivot pins. In this manner, the solar collector assembly and particularly the sidewalls thereof are permitted to expand and contract in length (such as by thermal expansion and contraction) without the harmful constraint of a completely fixed mounting means. Similar relief is provided by such mounting means to prevent undue stress caused by wind or snow loading deflection.

Still another possible mounting configuration is that in which the collector is secured along both its top edge and its bottom edge by a member and a mount similar to member 96 and mount 105 shown at the bottom edge only of the collector in FIGS. 12 and 13.

In a future detailed modification within the scope of the present invention, FIG. 14 illustrates a side wall configuration 12A over which clamping means 26A is provided to snap-fit over an upwardly projecting edge 12B of side wall 12A. An inner edge 26B of clamp 26A extends over the outer transparent cover 10 of the assembly and is retained thereon by the spring fit mating of flange 12B and clamp 26A.

While this invention has been described with respect to specific embodiments thereof, it should be understood that it is not limited thereto and that the appended claims are intended to be construed so as to encompass not only those embodiments of the invention shown and suggested herein, but also all other embodiments or variants thereof which may be made by those skilled in the art and which are within the true spirit and scope of the present invention.

Having thus described my invention, I claim as my invention, the following:

1. In a solar energy collector assembly including elongated side members having a top and bottom edge, a transparent sheet top cover member disposed at the top of said side members, and a bottom closure member disposed at the bottom of said side members, said side members, transparent sheet and closure member together forming an enclosed space housing within which is disposed a solar energy collector means, the improvement consisting of top cover securing and sealing means comprising a seal engaging the bottom surface of said top cover along and inward of the periphery thereof and clamping means pressing said top cover downwardly into engagement with said seal, the edge of said bottom surface between said seal and said periphery being free of engagement with any mating surface to prevent retention of condensate thereon, wherein said top cover securing and sealing means include a gasket resting on an inwardly turned upper flange of said side members, said clamping means extends upwardly from said side member and overlies the outer edge of the upper surface of said top cover, and the outer edge of said top cover extends outward of said gasket, said side member further including means for permitting the escape of condensate collected at the outer edge of said top cover.

2. Solar energy collector assembly, as recited in claim 1, wherein said inwardly turned upper flange of said side member includes an upwardly turned lip with a flat top surface adapted to sealingly engage said gasket.

3. Solar energy collector assembly, as recited in claim 1, wherein said side member upper flange lip top surface and said gasket are adapted to be snap fit together.

4. Solar energy collector assembly, as recited in claim 1, wherein said side member upper flange lip top surface includes a central depression along the length thereof and said gasket, in its relaxed state, is curved upwardly along its center line.

5. Solar energy collector assembly, as recited in claim 1, wherein said gasket includes at least one raised bead along the center line of its top surface.

6. Solar energy collector assembly, as recited in claim 1, wherein said gasket includes edge beads along its side edges, said edge beads being adapted to secured said gasket to said top surface of said side member flange lip.

7. Solar energy collector assembly, as recited in claim 1, wherein said gasket includes edge beads along its side edges, said edge beads being adapted to secured said gasket to said top surface of said side member flange lip.

8. Solar energy collector assembly, as recited in claim 1, wherein said inwardly turned upper lip also includes a downwardly turned lip adapted to receive a connector supporting said solar energy collector means.

9. Solar energy collector assembly, as recited in claim 1, wherein said downwardly turned lip includes a channel in which are secured said collector member securing means.

10. Solar energy collector assembly, as recited in claim 1, wherein said channel includes an upper opening and said securing means include an inverted "U" top section, one leg of which fits through said channel opening and is retained therein.

11. Solar energy collector assembly, as recited in claim 1, wherein a second transparent cover is interposed between said top cover and said solar energy collector.

* * * * *